United States Patent
Carlson et al.

(10) Patent No.: US 7,717,443 B1
(45) Date of Patent: May 18, 2010

(54) HIGH-CLEARANCE VEHICLE SUSPENSION WITH SPACER ARRANGEMENT MOUNTABLE BETWEEN SPINDLE AND WHEEL HUB MOUNTING BRACKET FOR ADJUSTING WORKING CLEARANCE

(75) Inventors: Brandon Cy Carlson, Ankeny, IA (US); Garry Eugene Baxter, Ankeny, IA (US); Daniel Craig Jordan, Ames, IA (US); Nathan D. Clarke, Pierre, SD (US); Scott Matthew Buse, Indianola, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 12/327,231

(22) Filed: Dec. 3, 2008

(51) Int. Cl.
*B60G 15/00* (2006.01)
(52) U.S. Cl. ............................................. 280/124.155
(58) Field of Classification Search .......... 280/124.127, 280/124.154, 124.155, 124.157, 92, 93.502, 280/93.505
See application file for complete search history.

(56) References Cited

U.S. PATENT DOCUMENTS

| | | | | |
|---|---|---|---|---|
| 5,125,681 A | * | 6/1992 | Brackette, Jr. | ........ 280/124.101 |
| 5,263,694 A | * | 11/1993 | Smith et al. | .................. 267/220 |
| 7,168,712 B2 | | 1/2007 | Celli | |
| 7,168,717 B2 | * | 1/2007 | Wubben et al. | ........ 280/124.127 |
| 7,328,887 B2 | * | 2/2008 | Leonard | ...................... 267/122 |
| 7,537,225 B2 | * | 5/2009 | Ryshavy et al. | ........ 280/124.155 |
| 2004/0090035 A1 | * | 5/2004 | Warinner | ............. 280/124.163 |

* cited by examiner

*Primary Examiner*—Faye M. Fleming

(57) ABSTRACT

The working clearance height of a high-clearance vehicle is normally established by four main suspension spindles that are respectively received for reciprocating within upright journals provided at the opposite ends of front and rear axle assemblies of the vehicle main frame, with the bottom end each of the main spindles being received in a bore at the top of an associated wheel motor housing that serves also as a wheel hub mounting bracket. In order to increase the working clearance height of the vehicle, an optional elongate spacer assembly is mounted between the bottom of each elongate main suspension spindle and the associated wheel motor housing. Each main suspension spindle is inclined slightly outwardly relative to a vertical plane extending in the direction of travel of the vehicle and, in order for the spacing between tires at opposite sides of the vehicle to remain the same, with or without the usage of the spacer assemblies, each spacer assembly includes a coupler spindle extending parallel to, and offset inwardly from, a pivot axis of the associated main suspension spindle by a distance calculated to result in the desired tire spacing, this coupler spindle being received in the bore at the top of the associated wheel motor housing.

6 Claims, 4 Drawing Sheets

HIGH-CLEARANCE VEHICLE SUSPENSION WITH SPACER ARRANGEMENT MOUNTABLE BETWEEN SPINDLE AND WHEEL HUB MOUNTING BRACKET FOR ADJUSTING WORKING CLEARANCE

FIELD OF THE INVENTION

The present invention relates to high-clearance, self-propelled sprayer vehicles, and more specifically relates to suspensions for such vehicles.

BACKGROUND OF THE INVENTION

Currently, there is a trend for application of late season fungicide to corn crops. The height of the corn crop during this time requires that the chemical be applied by via airplane sprayers or by self-propelled high-clearance agricultural sprayers having a ground-to-under frame clearance of about 76 inches to ensure minimal damage to crop. While there are commercially available sprayers that have the required clearance, these machines compromise stability, from a tip over standpoint, since side-to-side wheel spacing must be maintained in order to match conventional corn row spacing.

The high clearance for a known agricultural sprayer is provided by coupling elongate spindles between the main frame of the sprayer and each of four wheel support and motor housings, with each spindle being mounted for sliding in upright journal areas of knee joints, that form an integral part of an axle assembly, and with each spindle having an airbag suspension mounted to an upper end of the spindle. U.S. Pat. No. 7,168,717 discloses a high-clearance sprayer having spindles mounted in this fashion so as to provide the operating clearance.

The problem to be solved then is to provide a high-clearance sprayer vehicle which demonstrate desired stability from a tip over standpoint during the majority of the spraying season but which has sufficient clearance for applying chemicals to corn plants later in the spraying season.

SUMMARY OF THE INVENTION

According to the present invention, there is provided a high clearance sprayer vehicle having the above-noted desired characteristics.

An object of the invention is to provide a structure for selectively increasing the ground-to-under frame clearance of a high clearance sprayer vehicle without modifying the spacing between wheels at opposite sides of the vehicle.

The foregoing object is achieved by providing a spacer assembly which is selectively inserted between the bottom of the main suspension spindle and the wheel hub mounting bracket, with the lower end of the spacer assembly carrying a coupler spindle coupled to the wheel hub mounting bracket and being offset from the pivot axis of the main spindle by a distance which results in the wheel contacting the same location of the ground as it did when the wheel hub mounting bracket was mounted directly to the main suspension spindle.

The spacer assembly, according to one construction, is defined by upper and lower spacer castings, with the upper casting being secured to the bottom of the main suspension spindle, and with the lower spacer casting being bolted to the upper spacer casting and carrying the coupler spindle at an offset location relative to the axis of the main suspension spindle.

The foregoing and other objects will become apparent from a reading of the ensuing description together with the appended drawings.

DESCRIPTION OF THE PREFERRED EMBODIMENT

Figure 1:
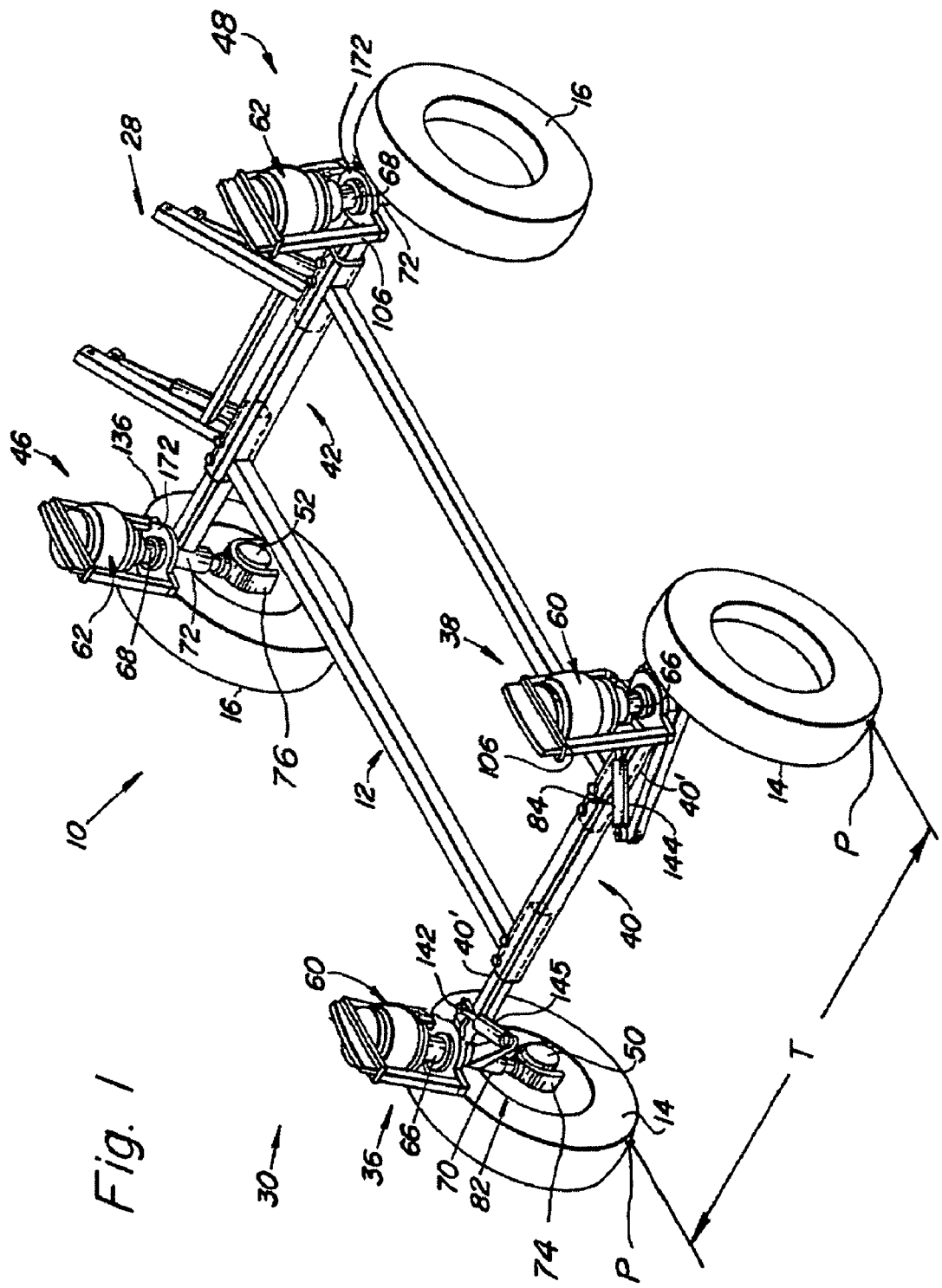
FIG. 1 is a schematic, left front perspective view of a prior art high-clearance vehicle chassis incorporating elongate suspension spindles for achieving the high-clearance height.

Referring now to FIG. 1, there is shown a chassis 10 of a high-clearance agricultural vehicle, such as a self-propelled agricultural field sprayer, having a fore-and-aft extending main frame 12 supported for movement over the ground by front and rear sets of wheels 14 and 16, respectively. A rear sprayer boom support 28 is located on a central rear location of the main frame 12. The high-clearance sprayer vehicle may be generally of the type shown and described in the aforementioned U.S. Pat. No. 7,168,717.

A steering and suspension system, indicated generally at 30, includes a four wheel independent spindle suspension having at least two steerable ground wheel assemblies 36 and 38 mounting the front set of wheels 14 and supported at opposite ends of a front axle structure 40. A rear axle structure 42 is provided at the rear of the frame 12 and supports non-steerable wheel assemblies 46 and 48, respectively mounting the wheels 16 outwardly of the sprayer boom support 28. Hydraulic drive motors 50 and 52 are connected to the wheels 14 and 16, respectively, and to a conventional controlled source of hydraulic fluid under pressure (not shown) on the sprayer vehicle to provide vehicle driving power.

The suspension system includes substantially similar adjustable, front and rear cushioning structures 60 and 62, respectively, supported above main front and rear suspension spindles 66 and 68, respectively. The front suspension spindles 66 are respectively supported within a pair of front spindle journals 70 forming an integral part of opposite ends of the front axle structure 40, the spindles 66 being mounted for rotation and axial movement in the journals 70. Not being steerable, the rear spindles 68 are supported only for axial movement within the journals 72, which form integral end portions of the rear axle structure 42. Lower ends of each of the front spindles 66 are secured to front housings 74 containing the wheel motors 50 and serving also as wheel hub mounting brackets for the wheels 14. Similarly, lower ends of each of the rear spindles 68 are secured to rear housings 76 containing the wheel motors 52 and serving also as wheel hub mounting brackets for the wheels 16.

As shown in FIG. 1, the middle of the front wheels 14 contact the ground at respective points P, which are spaced apart by a distance T corresponding to a desired spacing of the wheels 14 so that they may be driven between adjacent rows of standing corn plants in rows spaced from each other by a standard desired distance.

Figure 2:
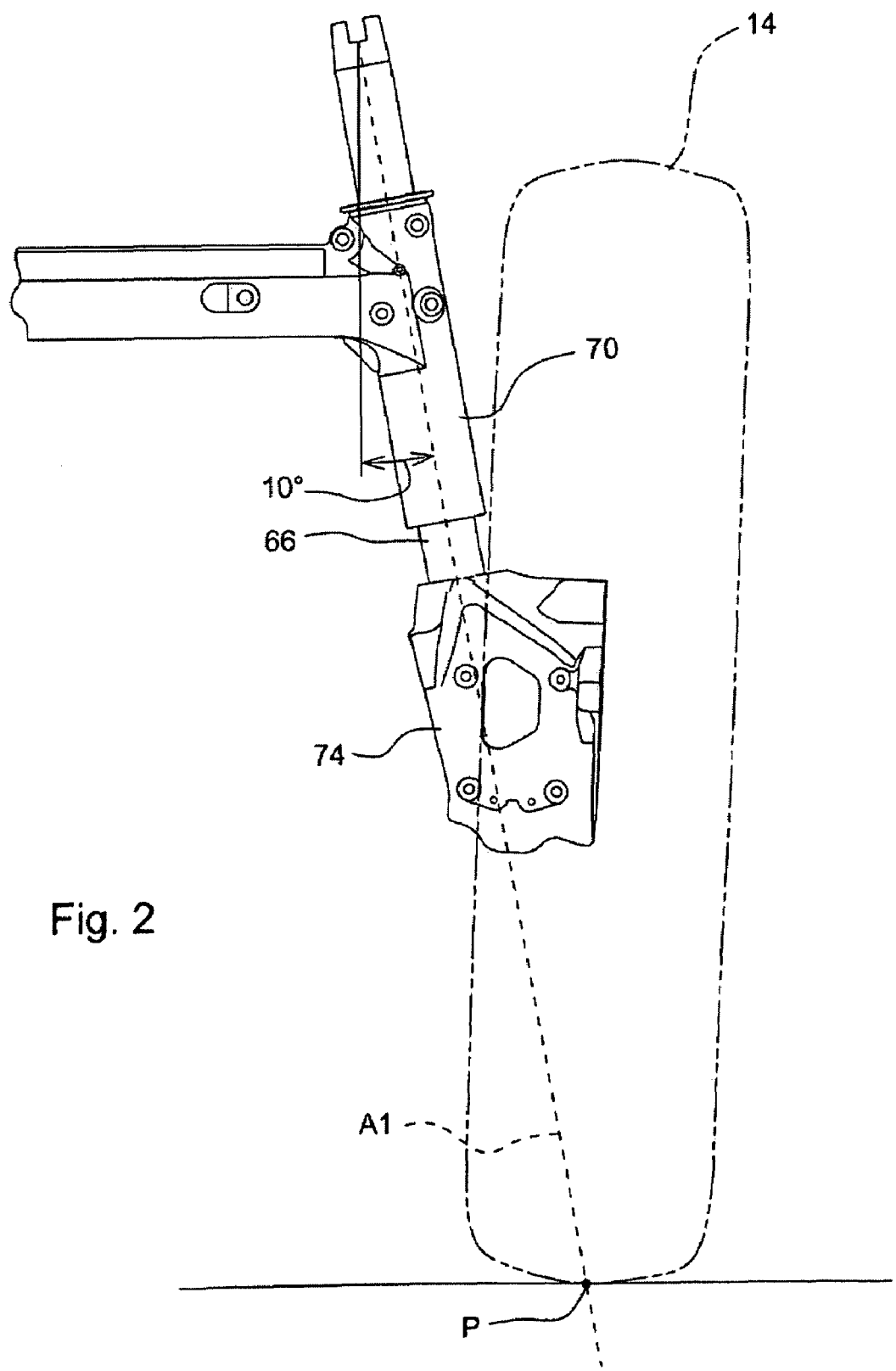
FIG. 2 is a front view, with parts removed of the left front spindle suspension of the prior art chassis shown in FIG. 1.

Referring now to FIG. 2, it can be seen that the left front suspension journal 70 makes an angle of 10° relative to a vertical plane extending in the direction of travel of the chassis 10 and that a longitudinal axis A1 of the main suspension spindle 66 intersects the ground at the point P which is at the middle of the wheel 14 mounted to the housing 74.

Figure 3:
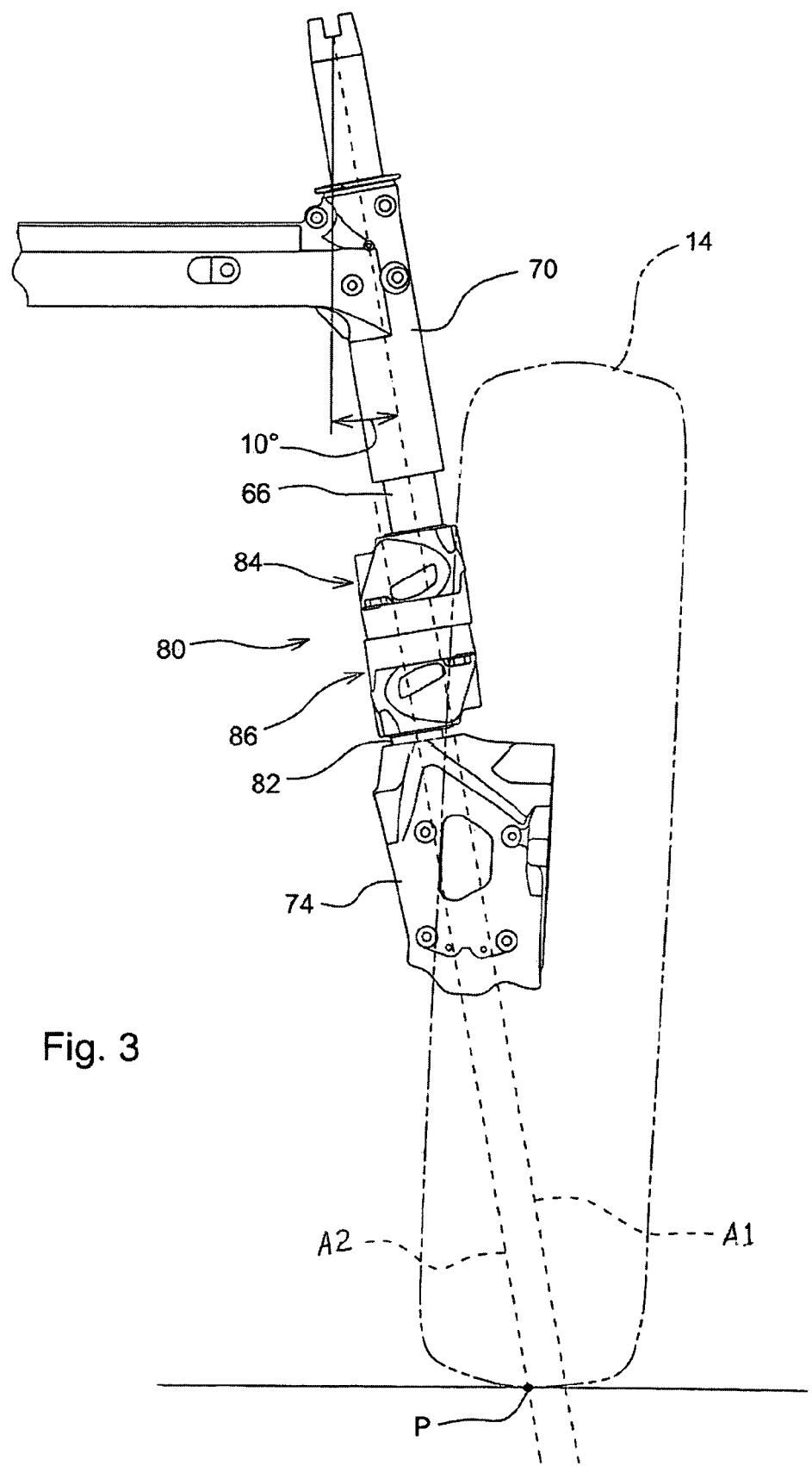
FIG. 3 is a view like FIG. 1, but showing the spacer assembly of the present invention coupled between the bottom of the suspension spindle and the combined drive motor housing and wheel hub mounting bracket.

Referring now to FIG. 3, there is shown the structure of the present invention for increasing the working clearance height of the chassis 10, noting that while only a structure for increasing the working height of the left front suspension spindle 66 is shown, it is to be understood that a similar structure is applied to each of the suspension spindles 66 and 68 so as to increase the working clearance height of the chassis 10. With respect to the left front main suspension spindle 66, it can be seen that instead of being mounted directly to the housing 74, the bottom of the spindle 66 is mounted to a spacer assembly 80, which, in turn is mounted to the housing 74 by a coupler spindle 82. The coupler spindle 82 is disposed along an axis A2 extending parallel to, and offset inwardly from, the axis A2, the offset being chosen such that the axis A2 intersects the ground at the point P, while the axis A1 intersects the ground at a point outwardly of the point P. Thus, even though the distance between the ground and the inclined main spindle 66 has increased, the distance by which the coupler spindle axis A2 is offset from the main spindle axis A1 is such as to compensate for this increase so that no change occurs in the spacing T between the wheels 14 when the spacer assemblies 80 are installed.

Figure 4:
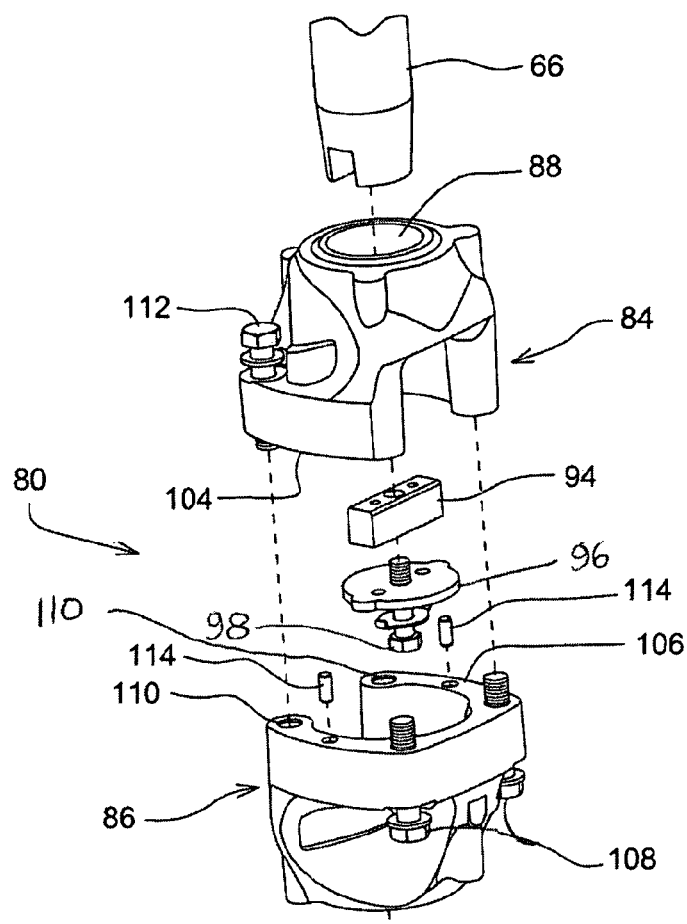
FIG. 4 is an exploded perspective view showing the spacer assembly and its connection with the main and coupler spindles, and the connection of the coupler spindle with the combined drive motor housing and wheel hub mounting bracket.
Figure 4:
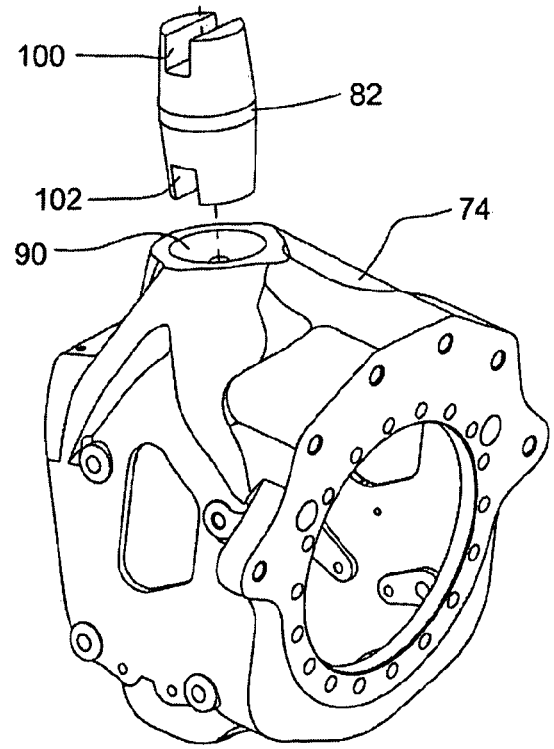

As can best be seen in FIG. 4, the spacer assembly 80 includes separate upper and lower spacer castings 84 and 86, respectively. The upper spacer casting 84 has an upper region provided with a cylindrical bore 88 having the same dimensions as a cylindrical bore 90 provided in the top of the housing 74. The bottom end of the main suspension spindle 66 is provided with a diametrically extending slot 92 which becomes aligned with diametrically opposite recesses (not shown) provided at a bottom end location of the bore 88. A key 94 is snuggly received within the slot 92 and has opposite ends received in the recesses of the bore 88. A flat circular plate 96 is received in the bottom of the bore 88 and has diametrically opposite tabs received in the recesses. A bolt 98 projects upwardly through aligned holes respectively provided in the center of the plate 96 and the key 94 and is tightened into a threaded bore extending axially into the bottom of the main suspension spindle 66 so as to tightly secure the upper spacer casting 84 for rotation with the spindle 66.

The bottom end of the lower spacer casting 86 is provided with a cylindrical bore (not visible) that is also sized identically to the bore 90 provided in the top of the housing 74. The coupler spindle 82 is relatively short and includes upper and lower ends respectively provided with upper and lower, diametrically extending slots 100 and 102. A top end of the bore in the lower end of the lower spacer casting 86 and the bottom end of the bore 90 provided in the housing 74 are respectively provided with diametrically opposite recesses (not shown) that are in alignment with the slots 100 and 102. Connecting hardware (not shown) identical to the key 94, plate 96 and bolt 98, described above for coupling the upper spacer casting 84 to the main spindle 66, is used for coupling the top end of the coupler spindle 82 to the lower spacer casting 86 and for coupling the lower end of the coupler spindle 82 to the housing 74.

The lower end of the upper spacer casting 84 defines a flat U-shaped coupling surface 104, while the upper end of the lower spacer casting 86 defines a similarly shaped flat U-shaped coupling surface 106 that is rotated 180° relative to the surface 104 so that a pair of tapped and threaded bores (not visible) respectively provided at end regions of the U-shaped coupling surface 104 are in axial alignment with a pair of through bores extending through the closed end of the coupling surface 106 and containing clamping bolts 108 that are tightened within the threaded bores. Similarly, located at the end regions of the lower U-shaped surface are the upper ends of threaded and tapped holes 110 which extend into the lower spacer casting 86 and are in alignment with through bores having lower ends (not visible) located in the closed end of the U-shaped surface 104, these through bores containing clamping bolts 112 (only one shown) that project downwardly and are tightened into the threaded and tapped holes 110. A pair of dowels 114 are provided in aligned holes in each of the limbs of the U-shaped surfaces 104 and 106 which ensure that the upper and lower spacer castings 84 and 86 are properly oriented relative to each when they are being coupled together, thereby ensuring that the axis A2 of the coupler spindle 82 is correctly offset from axis A1 of the main spindle 66.

Thus, it will be appreciated that, by using spacer assemblies 80, one can provide a relatively large increase to the operating clearance height of a high-clearance vehicle, such as an agricultural sprayer, without altering the spacing between the wheels at the opposite sides of the vehicle. Further, it will be appreciated that instead of being made from two separate castings, the spacer assembly could be made as a single part.

Having described the preferred embodiment, it will become apparent that various modifications can be made without departing from the scope of the invention as defined in the accompanying claims.

The invention claimed is:

1. In a suspension assembly for a high-clearance vehicle having a forward direction of travel and a first operating clearance height, the suspension assembly including an upright spindle journal fixed to a frame of said vehicle, a main suspension spindle received in said journal for at least sliding axially within said journal, and a wheel hub mounting member being coupled to a lower end of said main suspension spindle, the improvement comprising; a spacer assembly for increasing said clearance height being optionally connected between said lower end of said main suspension spindle and said wheel hub mounting member, said spacer assembly including upper and lower ends respectively provided with upper and lower bores and a coupler spindle having an upper end located within said lower bore, said upper bore receiving a bottom end of said main suspension spindle; a first coupler assembly fixing said spacer assembly for movement with said main suspension spindle; said wheel hub mounting member having a third bore sized identically to said first bore located in an upper end thereof; said coupler spindle having a bottom end section projecting downwardly from said spacer assembly and being received in said third bore, and second and third coupler assemblies respectively fixing said coupler spindle to said spacer assembly and to said wheel hub mounting member.

2. The suspension assembly, as defined in claim 1, wherein said upper and lower bores of said spacer assembly are identically sized.

3. The suspension assembly, as defined in claim 1, wherein said upright spindle journal is inclined outwardly from a vertical plane extending parallel to said direction of travel; and said lower bore of said spacer assembly extending parallel to said upper bore and being offset inwardly from said upper bore by a distance which compensates for the spacing between the bottom of the main suspension spindle and the hub mounting member so that a wheel mounted to the hub when no spacer assembly is used will contact the ground in the same location as it does when the spacer assembly is used.

4. The suspension assembly, as defined in claim 1, wherein the spacer assembly includes separate upper and lower castings which are bolted together.

5. The suspension assembly, as defined in claim 2 wherein said spacer assembly includes separate upper and lower castings which are coupled together; said upper casting being provided with said upper bore and said lower casting being provided with said lower bore.

6. The suspension assembly, as defined in claim 3, wherein said spacer assembly includes upper and lower castings which are coupled together.

\* \* \* \* \*